(12) United States Patent
Sun et al.

(10) Patent No.: US 10,846,926 B2
(45) Date of Patent: Nov. 24, 2020

(54) SYSTEMS AND METHODS FOR FILLING HOLES IN A VIRTUAL REALITY MODEL

(71) Applicant: Ke.com (Beijing) Technology Co., Ltd, Beijing (CN)

(72) Inventors: Xin Sun, Beijing (CN); Zhe Xie, Beijing (CN)

(73) Assignee: KE.COM (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/426,035

(22) Filed: May 30, 2019

(65) Prior Publication Data
US 2019/0378332 A1    Dec. 12, 2019

(30) Foreign Application Priority Data
Jun. 6, 2018 (CN) .......................... 2018 1 0575202

(51) Int. Cl.
*G06T 17/20* (2006.01)
*G06T 19/20* (2011.01)
*G06T 15/04* (2011.01)

(52) U.S. Cl.
CPC .............. *G06T 17/20* (2013.01); *G06T 15/04* (2013.01); *G06T 19/20* (2013.01); *G06T 2219/2012* (2013.01); *G06T 2219/2021* (2013.01)

(58) Field of Classification Search
CPC ......... G06T 15/00–87; G06T 17/00–30; G06T 19/00–20
See application file for complete search history.

(56) References Cited

U.S. PATENT DOCUMENTS

| 6,229,547 B1 | 5/2001 | Grzeszczuk |
| 6,850,235 B2 | 2/2005 | Levanon et al. |
| 8,014,978 B2 * | 9/2011 | Ueda ....................... G06T 17/00 345/419 |

(Continued)

FOREIGN PATENT DOCUMENTS

CN    102521869 A    6/2012

OTHER PUBLICATIONS

Frueh, Christian, Siddharth Jain, and Avideh Zakhor. "Data processing algorithms for generating textured 3D building facade meshes from laser scans and camera images." International Journal of Computer Vision 61.2 (2005): 159-184. (Year: 2005).*

*Primary Examiner* — Daniel F Hajnik
(74) *Attorney, Agent, or Firm* — Bayes PLLC

(57) ABSTRACT

Systems and methods for constructing a three-dimensional virtual reality model of a property are disclosed. An exemplary system includes a storage device configured to store point cloud data and texture information captured of the property and at least one processor. The processor constructs a structure polygon mesh based on the point cloud data and constructs a textured polygon mesh by mapping the texture information to the structure polygon mesh. The processor further identifies a hole in the textured polygon mesh based on the mapping and determine an area of the hole is below a predetermined threshold. The processor then identifies boundary polygons in the textured polygon mesh that are contiguous to the hole and estimates texture information of the hole, and repair the textured polygon mesh using the estimated texture information of the hole polygons.

20 Claims, 6 Drawing Sheets

(56) References Cited

U.S. PATENT DOCUMENTS

| | | | |
|---|---|---|---|
| 2005/0140670 A1* | 6/2005 | Wu | G06T 17/20 |
| | | | 345/419 |
| 2008/0033641 A1* | 2/2008 | Medalia | G06T 19/003 |
| | | | 701/533 |
| 2008/0036755 A1* | 2/2008 | Bae | G06T 17/205 |
| | | | 345/418 |
| 2009/0289938 A1* | 11/2009 | Paulsen | G06T 17/20 |
| | | | 345/420 |
| 2010/0026712 A1* | 2/2010 | Aliprandi | G06T 15/20 |
| | | | 345/629 |
| 2015/0154795 A1* | 6/2015 | Ogale | G06T 17/05 |
| | | | 345/420 |
| 2016/0335809 A1* | 11/2016 | Forutanpour | G06T 7/579 |

* cited by examiner

SYSTEMS AND METHODS FOR FILLING HOLES IN A VIRTUAL REALITY MODEL

RELATED APPLICATIONS

This application hereby claims the benefits of priority to Chinese Application No. CN201810575202.7 filed on Jun. 6, 2018, which is hereby incorporated by reference in its entirety.

TECHNICAL FIELD

The present disclosure relates to systems and methods for constructing a Virtual Reality (VR) model, and more particularly, to systems and methods for filling holes in a three-dimensional VR model through polygon mesh extrapolation.

BACKGROUND

In the real estate market, when a person wants to buy or rent a property, he typically would ask to tour the property first in order to visually experience the layout and furnishing. House tours are often conducted in person, e.g., by the property owner or a real estate agent. During the tour, the visitor gets to see the property and the property owner/agent accompanying the tour will introduce features of the property to the visitor. For example, when the visitor is in the kitchen, features such as size of the room, cabinet and counter space, installed appliances, and lighting conditions may be introduced orally. While property tours are informative to the potential buyer/renter, it is also time consuming and inefficient.

Recently, VR technology has been applied to conduct these tours virtually. Videos and images of the property are taken in advance. A three-dimensional model is rendered based on the data captured of the property, such as point cloud data and images. As a result, a visitor can remotely view the property without having to do it in person. On the other hand, the property owner/agent may log into the system to introduce the property features in real-time. VR tours thus save both visitor and property owner/agent's time by recreating the in-person experience virtually online.

However, challenges remain in VR tours. In particular, when capturing images or videos of the property, some structures or property features may be obstructed by other objects, such as people, pets, boxes, household items, etc., that are not meant to be part of the property shown to the visitor. Texture information, usually contained in the captured images, is thus missing for the three-dimensional model rendered from the captured data. The areas with missing texture information will be shown as holes in the three-dimensional model. As a result, the three-dimensional model may not accurately reflect the property.

Embodiments of the disclosure improve the existing VR touring systems and methods for filling holes in a three-dimensional VR model through polygon mesh extrapolation.

SUMMARY

In one aspect, a system for constructing a three-dimensional virtual reality model of a property is disclosed. The system includes a storage device configured to store point cloud data and texture information captured of the property and at least one processor. The at least one processor is configured to construct a structure polygon mesh of the three-dimensional virtual reality model based on the point cloud data and construct a textured polygon mesh of the three-dimensional virtual reality model by mapping the texture information to the structure polygon mesh. The resulted structure polygon mesh includes a first set of polygons and the resulted textured polygon mesh includes a second set of polygons. The at least one processor is further configured to identify a hole in the textured polygon mesh based on the mapping and determine an area of the hole is below a predetermined threshold. The hole includes a plurality of hole polygons. The at least one processor is also configured to identify boundary polygons in the second set of polygons that are contiguous to the hole and estimate texture information of the hole polygons based on texture information of the boundary polygons and respective distances between the hole polygons and the boundary polygons. The at least one processor is additionally configured to repair the textured polygon mesh using the estimated texture information of the hole polygons.

In another aspect, a computer-implemented method for constructing a three-dimensional virtual reality model of a property. The method includes constructing, by at least one processor, a structure polygon mesh of the three-dimensional virtual reality model based on point cloud data captured of the property. The method further includes constructing, by the at least one processor, a textured polygon mesh of the three-dimensional virtual reality model by mapping the texture information to the structure polygon mesh. The resulted structure polygon mesh includes a first set of polygons and the resulted textured polygon mesh includes a second set of polygons. The method further includes identifying, by the at least one processor, a hole in the textured polygon mesh based on the mapping, and determining, by the at least one processor, an area of the hole is below a predetermined threshold. The hole includes a plurality of hole polygons. The method also includes identifying, by the at least one processor, boundary polygons in the second set of polygons that are contiguous to the hole, and estimating, by the at least one processor, texture information of the hole polygons based on texture information of the boundary polygons and respective distances between the hole polygons and the boundary polygons. The method additionally includes repairing, by the at least one processor, the textured polygon mesh using the estimated texture information of the hole polygons.

In yet another aspect, a non-transitory computer-readable medium having stored thereon computer instructions is disclosed. The computer instructions, when executed by at least one processor, perform a method for constructing a three-dimensional virtual reality model of a property. The method includes constructing a structure polygon mesh of the three-dimensional virtual reality model based on point cloud data captured of the property. The method further includes constructing a textured polygon mesh of the three-dimensional virtual reality model by mapping the texture information to the structure polygon mesh. The resulted structure polygon mesh includes a first set of polygons and the resulted textured polygon mesh includes a second set of polygons. The method further includes identifying a hole in the textured polygon mesh based on the mapping, and determining an area of the hole is below a predetermined threshold. The hole includes a plurality of hole polygons. The method also includes identifying boundary polygons in the second set of polygons that are contiguous to the hole and estimating texture information of the hole polygons based on texture information of the boundary polygons and respective distances between the hole polygons and the boundary polygons. The method additionally includes repairing the textured polygon mesh using the estimated texture information of the hole polygons.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
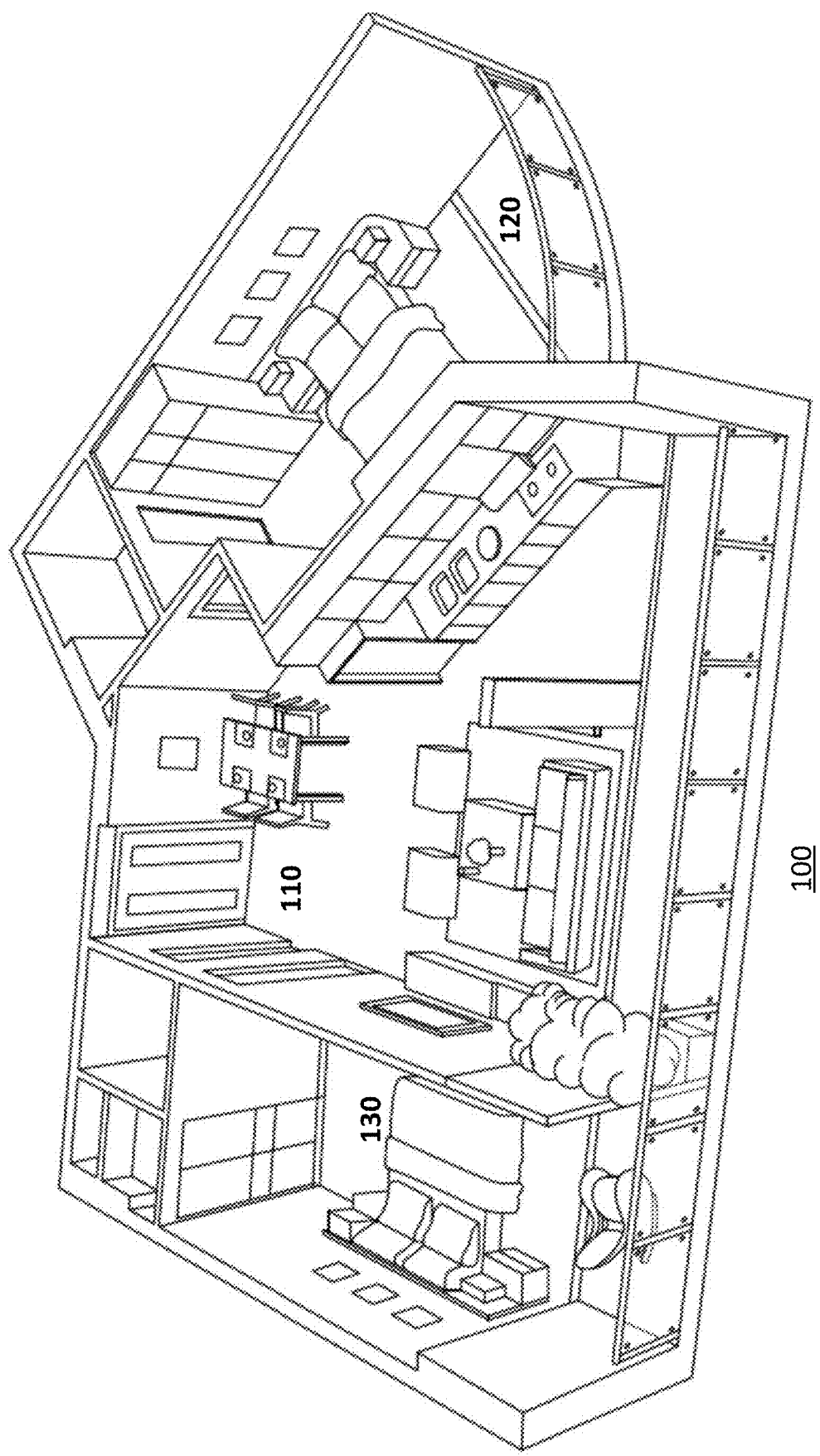
FIG. 1 illustrates a schematic diagram of an exemplary three-dimensional model including multiple rooms, according to embodiments of the disclosure.

FIG. 1 illustrates a schematic diagram of an exemplary three-dimensional model 100 including multiple rooms, according to embodiments of the disclosure. In some embodiments, three-dimensional model 100 may be a VR model of a property, such as a house, an apartment, a townhouse, a garage, a warehouse, an office building, a hotel, and a store, etc. As shown in FIG. 1, three-dimensional model 100 virtually recreates the real-world property including its layout (e.g., the framing structures that divide the property into several rooms such as walls and counters), finishing (e.g., kitchen/bathroom cabinets, bathtub, island, etc.), fixtures installed (e.g., appliances, window treatments, chandeliers, etc.), and furniture and decorations (e.g., beds, desks, table and chairs, sofas, TV stands, bookshelves, wall paintings, mirrors, plants, etc.)

Three-dimensional model 100 may be divided into multiple rooms or functional spaces by interior walls. Some rooms may have multiple functions. For example, three-dimensional model 100 may include a great room 110 that has combined functions of a living room and a kitchen. Three-dimensional model 100 may further include two bedrooms 120 and 130, their attached bathrooms, as well as balconies.

Various data may be captured in the property in order to create three-dimensional model 100. For example, a camera may be placed at various positions to capture images and/or videos of great room 110. In some embodiments, camera 220 may be a digital camera, a binocular camera, a video camera, a panoramic camera, etc. In some embodiments, a three-dimensional scanner may be configured to capture three-dimensional information (e.g., point cloud data or other data that includes depth information) of the room. The camera/scanner may be mounted on a mounting structure (e.g., a tripod) or be carried by an operator. The camera may be rotated or otherwise adjusted to capture images or videos from different angles and heights.

In some embodiments, three-dimensional model 100 may be constructed based on the point cloud data and images/video captured by the camera(s). Three-dimensional model 100 represents a property using a collection of points in three-dimensional space, connected by various geometric entities such as polygons, lines, curved surfaces, etc. In some embodiments, three-dimensional model 100 may be a shell/boundary model, such as a textured polygonal model created through polygonal modeling. In a textured polygonal model, points in a three-dimensional space (known as "vertices") are connected by line segments to form a polygon mesh. The model approximates curved surfaces using many polygons, such as triangles, quads, pentagons, hexagons, etc.

Figure 2:
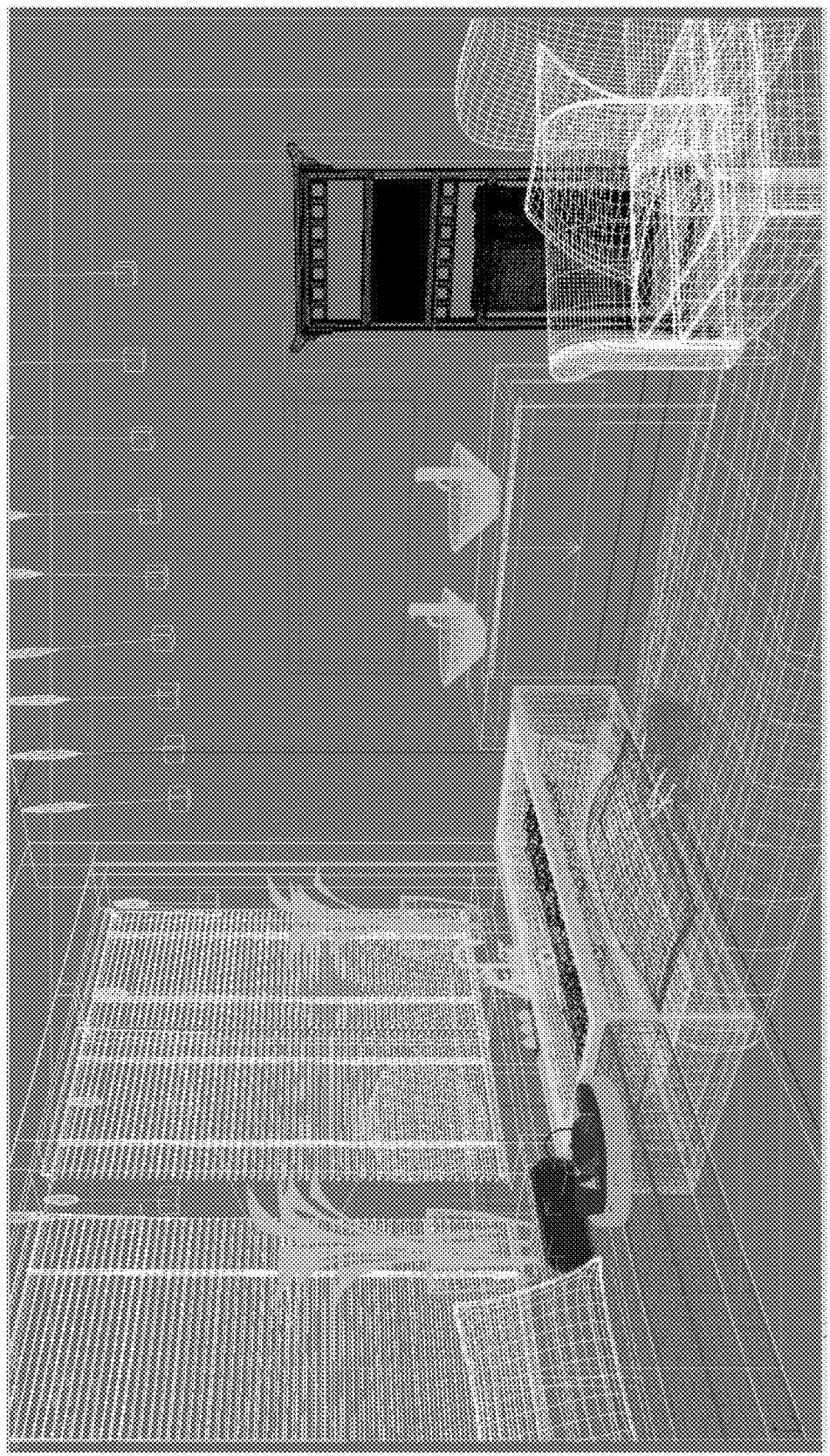
FIG. 2 illustrates a schematic diagram of an exemplary structure polygon mesh for a three-dimensional model, according to embodiments of the disclosure.

In some embodiments, a textured polygonal model may be created in two steps. In the first step, a structure polygon mesh may be constructed based on three-dimensional structural information, such as point cloud data. The structure polygon mesh includes a set of polygons connected through their edges and vertices to form a curved surface of three-dimensional model 100. In other words, the structure polygon mesh defines the structure (e.g., shape, size, curvature) of the three-dimensional model. For example, FIG. 2 illustrates a schematic diagram of an exemplary structure polygon mesh 200 for a three-dimensional model, according to embodiments of the disclosure. Structure polygon mesh 200 outlines the structures of a room and various objects therein, e.g., furniture, lights, and decorative pieces. Although structure polygon mesh 200 uses quads (four-sided polygons), it is contemplated that other polygons, such as triangles, may be used in addition or in alternative.

In the second step, texture information may be mapped to the structure polygon mesh to form a textured polygon mesh. For example, images of the room taken at various angles may be cut and pasted to the polygons in the structure polygon mesh. That is, the textured polygon mesh "paints" the two-dimensional texture information onto the three-dimensional structure.

Shell models, such as textured polygonal models, must be manifold, i.e., having no holes or cracks in the shell, to be meaningful to reflect a real object. However, during data capturing, texture information of certain property features may be missing due to various reasons. For example, the view of such a feature may be obstructed by another object. Alternatively, the part of the data may be lost due to data corruption when stored in the camera, during transmission from the camera to a modeling device, or when stored in the modeling device. As a result, some polygons in the textured polygon mesh are not covered with texture information. Accordingly, the rendered three-dimensional model may contain holes, which greatly impair user experience.

The disclosed systems and methods can repair holes in the three-dimensional model. In some embodiments, the disclosed systems and methods first identify the hole by searching for areas in the textured polygon mesh that do not have mapped texture information. For example, assuming the structure polygon mesh includes a first set of polygons and the textured polygon mesh includes a second set of polygons, those polygons in the first set that do not have corresponding textured polygons in the second set may be identified as in the hole. In some embodiments, the disclosed systems and methods may only repair the hole when it is sufficiently small, e.g., if the area of the hole is below a predetermined threshold. The hole composes hole polygons corresponding to the polygons in the same area of the structure mesh.

In some embodiments, the disclosed systems and methods identify boundary polygons in the second set of polygons that are contiguous to the hole. A polygon is "contiguous to" the hole if it shares at least an edge or a vertex with any hole polygon. In some embodiments, texture information of these boundary polygons is used to estimate texture information of the hole polygons. This is based on the assumption that polygons that are close to each other typically carry similar texture information. However, to reduce the impact of singularity in texture information, the texture information of multiple boundary polygons may be used. In some embodiments, the texture information may be weighted based on how close the respective boundary polygons are to the hole polygon. Consistent with the present disclosure, for example, the pixel values of the vertices of the hole polygons are determined as a weighted sum of pixel values of the vertices of the boundary polygons weighted by their respective distances between the hole polygons and the boundary polygons. The hole in the textured polygon mesh is thus repaired/filled by painting the estimated texture information to the hole polygons.

Although the exemplary three-dimensional model shown in FIG. 1 is a model for a property, it is contemplated that the disclosed systems and methods may also be applied to construct three-dimensional models of other objects, such as a vehicle, a person, an animal, a road segment, a park, etc. A person of ordinary skill can adapt the disclosed systems and methods without undue experimentation for different three-dimensional models.

Figure 3:
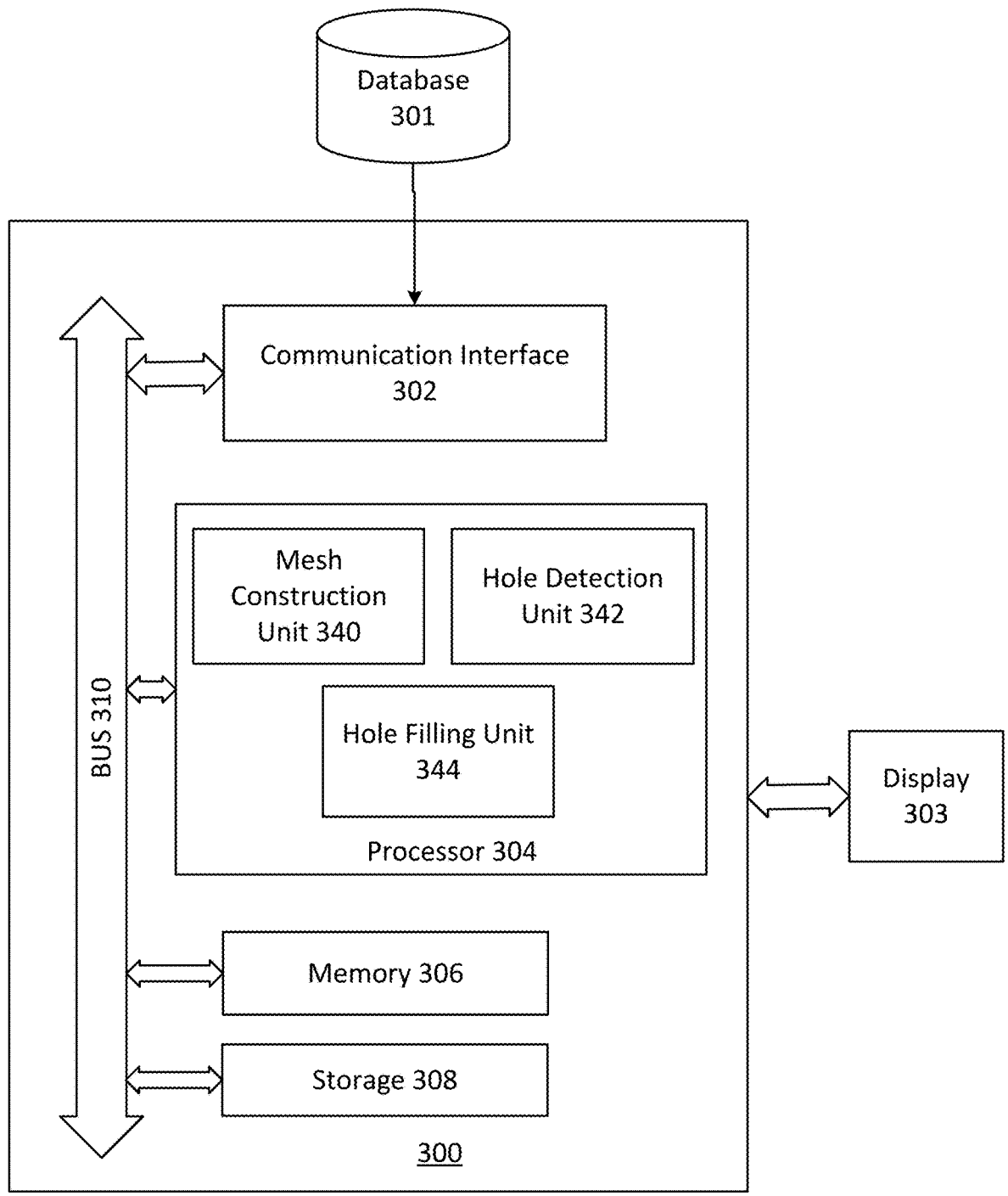
FIG. 3 is a block diagram of an exemplary system for constructing a three-dimensional model, according to embodiments of the disclosure.

FIG. 3 is a block diagram of an exemplary system 300 for constructing a three-dimensional model, according to embodiments of the disclosure. In some embodiments, system 300 may be implemented by a physical server or a service in the cloud. In some other embodiments, system 300 may be implemented a computer or a consumer electronic device such as a mobile phone, a pad, or a wearable device. In some embodiments, the three-dimensional model e.g., three-dimensional model 100, may be rendered in real-time of the VR tour or offline prior to the tour.

As shown in FIG. 3, system 300 may include a communication interface 302, a processor 304, a memory 306, a storage 308, and a bus 310. In some embodiments, system 300 may have different modules in a single device, such as an integrated circuit (IC) chip (implemented as an application-specific integrated circuit (ASIC) or a field-programmable gate array (FPGA)), or separate devices with dedicated functions. Components of system 300 may be in an integrated device, or distributed at different locations but communicate with each other through a network (not shown). The various components of system 300 may be connected to and communicate with each other through bus 310.

Communication interface 302 may send data to and receive data from components such as camera 220 and database 301 via direct communication links, a Wireless Local Area Network (WLAN), a Wide Area Network (WAN), wireless communication networks using radio waves, a cellular network, and/or a local wireless network (e.g., Bluetooth™ or WiFi), or other communication methods. In some embodiments, communication interface 302 can be an integrated services digital network (ISDN) card, cable modem, satellite modem, or a modem to provide a data communication connection. As another example, communication interface 302 can be a local area network (LAN) card to provide a data communication connection to a compatible LAN. Wireless links can also be implemented by communication interface 302. In such an implementation, communication interface 302 can send and receive electrical, electromagnetic or optical signals that carry digital data streams representing various types of information via a network.

Consistent with some embodiments, communication interface 302 may receive structural information, e.g., point cloud data, and texture information, e.g., images and videos, captured of the property. For example, the structural information and texture information captured by camera/scanner in the property may be stored in database 301. Communication interface 302 may provide the received information or data to memory 306 and/or storage 308 for storage or to processor 304 for processing.

Processor 304 may include any appropriate type of general-purpose or special-purpose microprocessor, digital signal processor, or microcontroller. Processor 304 may be configured as a separate processor module dedicated to providing VR house tours. Alternatively, processor 404 may be configured as a shared processor module for performing other functions related to or unrelated to VR house tours. For example, VR house tour is just one application installed on a versatile device.

As shown in FIG. 3, processor 304 may include multiple modules, such as a mesh construction unit 340, a hole detection unit 342, and a hole filling unit 344 and the like. These modules (and any corresponding sub-modules or sub-units) can be hardware units (e.g., portions of an integrated circuit) of processor 304 designed for use with other components or to execute part of a program. The program may be stored on a computer-readable medium (e.g., memory 306 and/or storage 308), and when executed by processor 304, it may perform one or more functions. Although FIG. 3 shows units 340-344 all within one processor 304, it is contemplated that these units may be distributed among multiple processors located near or remotely with each other.

Memory 306 and storage 308 may include any appropriate type of mass storage provided to store any type of information that processor 304 may need to operate. Memory 306 and storage 308 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 306 and/or storage 308 may be configured to store one or more computer programs that may be executed by processor 304 to perform three-dimensionally modeling functions disclosed herein. For example, memory 306 and/or storage 308 may be configured to store program(s) that may be executed by processor 304 to provide a VR tour of a property to a user using a three-dimensional VR model with holes filled.

Memory 306 and/or storage 308 may be further configured to store information and data used by processor 304. For instance, memory 306 and/or storage 308 may be configured to store point cloud data and various images/videos captured of a property. Memory 306 and/or storage 308 may also be configured to store intermediate data generated by processor 304, such as the polygon meshes, distances between hole polygons and boundary polygons. The various types of data may be stored permanently, removed periodically, or disregarded immediately after each frame of data is processed.

In some embodiments, system 300 may optionally include a display 303. In some embodiments, display 303 may be external to system 300 but be connected with system 300. Display 303 may display the views in the three-dimensional model to the users. In some embodiments, display 303 may further function as a user interface to receive user input. Display 303 may include a Liquid Crystal Display (LCD), a Light Emitting Diode Display (LED), a plasma display, or any other type of display, and provide a Graphical User Interface (GUI) presented on the display for user input and data display. The display may include a number of different types of materials, such as plastic or glass, and may be touch-sensitive to receive commands from the user. For example, the display may include a touch-sensitive material that is substantially rigid, such as Gorilla Glass™, or substantially pliable, such as Willow Glass™.

Figure 4:
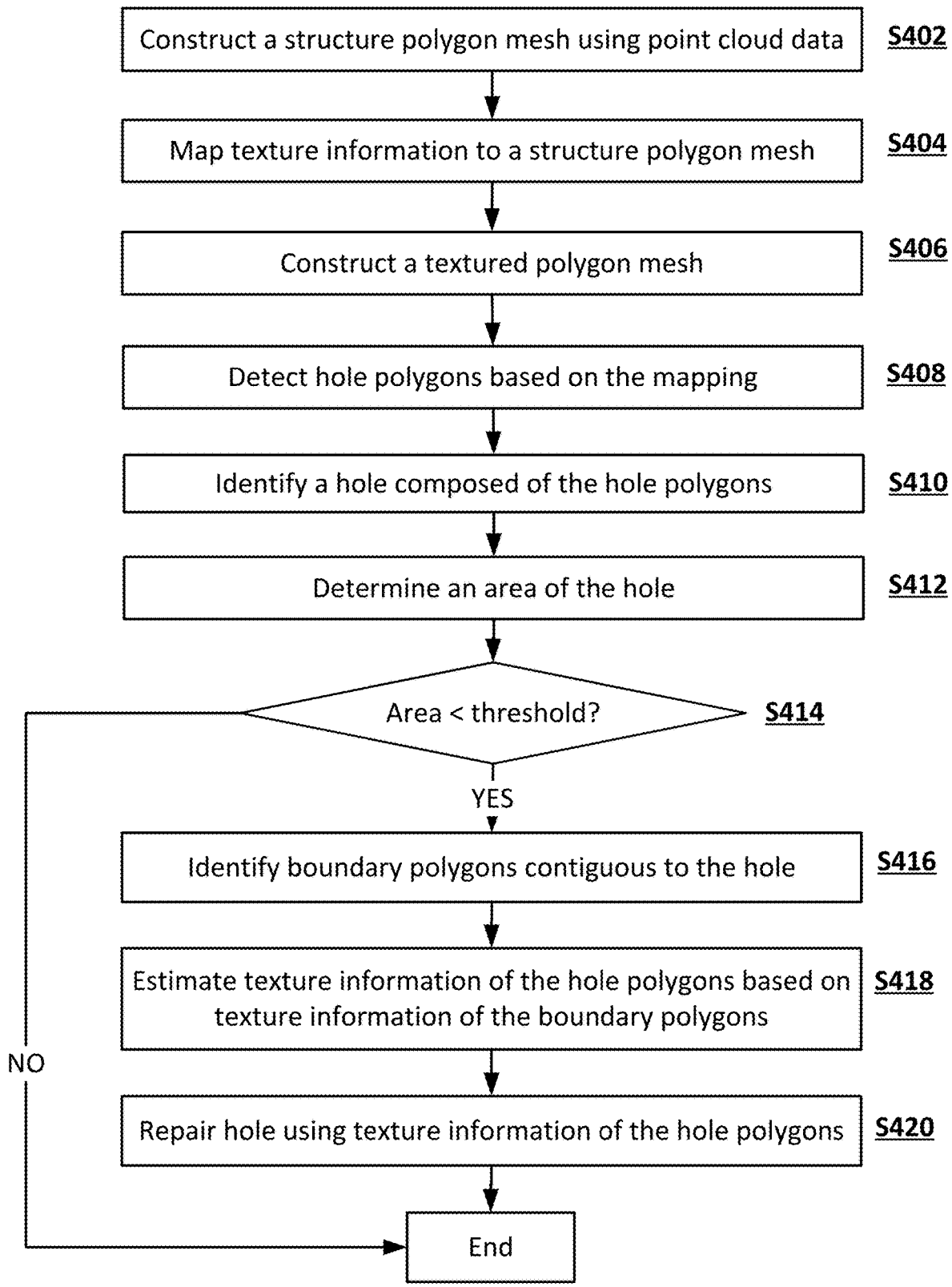
FIG. 4 is a flowchart of an exemplary method for constructing a three-dimensional model, according to embodiments of the disclosure.

The modules of processor 304 may be configured to execute program(s) stored in memory 306/storage 308 to perform a method for providing a VR tour to a user. For example, FIG. 4 is a flowchart of an exemplary method 400 for constructing a three-dimensional model, according to embodiments of the disclosure. Method 400 may include steps S402-S420 as described below. It is to be appreciated that some of the steps may be optional to perform the disclosed methods provided herein. Further, some of the steps may be performed simultaneously, or in a different order than shown in FIG. 4.

In some embodiments, method 400 may be performed in real-time of the VR tour. For example, method 400 may be triggered when a user selects a property/room to tour. In some embodiments, system 300 may automatically initiate method 400 when it detects that a user logs into the VR tour application. In some embodiments, method 400 may be performed entirely or partially offline prior to the tour, especially when the amount of data for the property is large and system 300 cannot construct the three-dimensional model in real-time.

In step S402, mesh construction unit 340 may construct a structure polygon mesh of the three-dimensional model, such as structure polygon mesh 200 of FIG. 2, using point cloud data. In some embodiments, the three-dimensional model may be a model of a property, such as a house, an apartment, a townhouse, a garage, a warehouse, an office building, a hotel, and a store, etc. In some embodiments, the structure polygon mesh may be saved as a "mesh.ply" file and stored in memory 306/storage 308. The "mesh.ply" file contains structural information of three-dimensional model 100, carried by the polygons.

A point cloud is a set of data points in three-dimensional space. In some embodiments, point cloud data is produced by a three-dimensional scanner, which measures a large number of points on the external surfaces of objects around them. In some embodiments, mesh construction unit 340 converts the point cloud data to polygon mesh using surface reconstruction methods. Various surface reconstruction approaches may also be used for the conversion. For example, some approaches build a network of triangles over the existing vertices of the point cloud, such as Delaunay triangulation, alpha shapes, and ball pivoting. Some others convert the point cloud into a volumetric distance field and reconstruct the implicit surface so defined through a marching cubes algorithm. Consistent with the present disclosure, mesh construction unit 340 may use Poisson surface reconstruction to construct the structure polygon mesh.

In step S404, mesh construction unit 340 may map texture information to the structure polygon mesh constructed in step S402. In some embodiments, texture information may be contained in image/videos captured of the property. The images can be matched to the polygons of the structure polygon mesh based on position information. For example, the images and the point cloud data may be co-registered according to the positions (e.g., longitudes and latitudes) and angles at which they are captured. In some embodiments, one or more images may be mapped to one polygon.

In step S406, the image(s) matched to a polygon are then "painted" to the surface of the polygon to form a textured polygon mesh. In some embodiments, the images may be oriented according to the orientation of the polygon before being "painted" onto the polygon. That is, the images may be captured from orientations different from the orientation of the polygon, and thus need to be transformed accordingly. The textured polygons mesh may be saved as an "output.obj" file and stored in memory 306/storage 308. The "output.obj" file contains polygons that are matched with texture information.

Figure 5B:
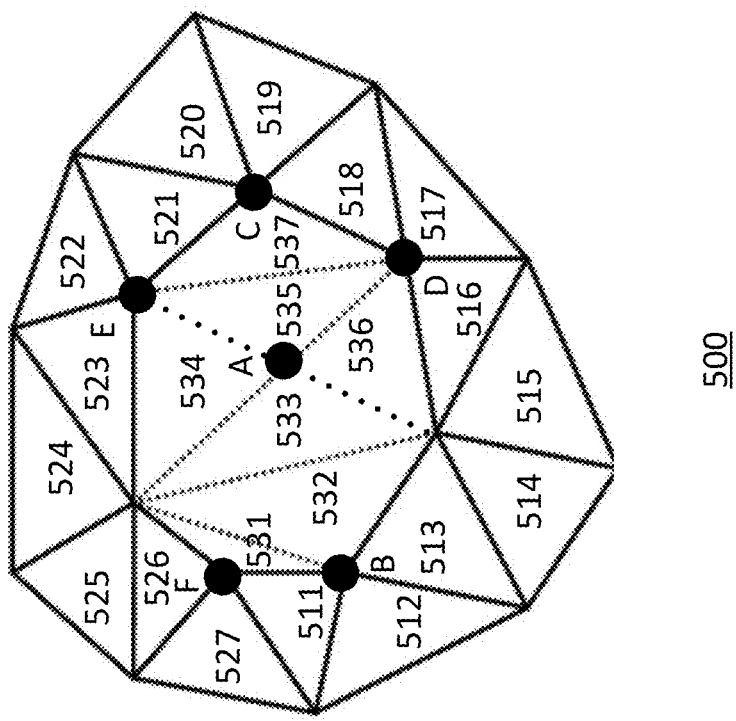
FIG. 5A and FIG. 5B illustrate an exemplary textured polygon mesh with a hole, according to embodiments of the disclosure.
Figure 5A:
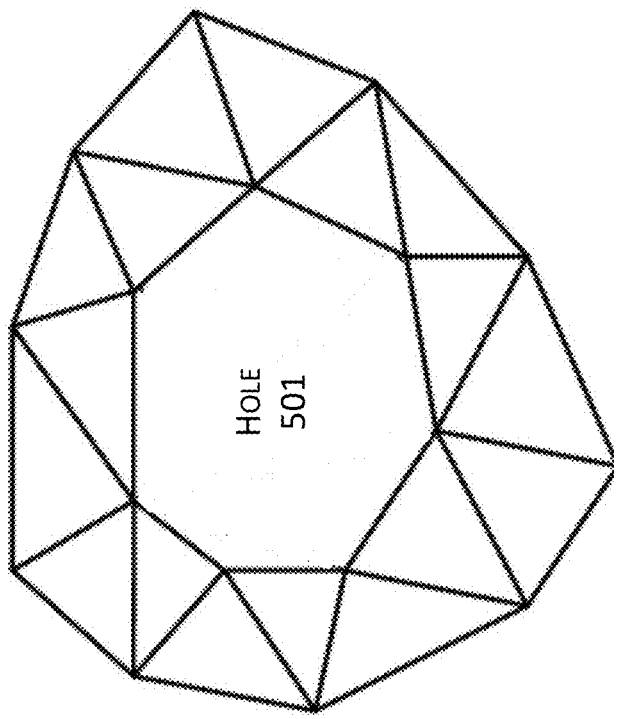

In some embodiments, some polygons in the textured polygon mesh do not have any image matched thereto. In that case, the textured polygon mesh is considered as containing one or more holes. FIG. 5A and FIG. 5B illustrate an exemplary textured polygon mesh 500 with a hole 501, according to embodiments of the disclosure. The "polygons" illustrated in textured polygon mesh 500 are triangles, but it is contemplated the other shapes of polygons can be used as well. Each triangle has three vertices and three edges. The triangles in the mesh connect with others by edges and/or vertices. As shown in FIG. 5A, textured polygon mesh 500 contains hole 501 that lack texture information. Hole 501 may contain several polygons, known as "hole polygons," such as polygons 531-537, as shown in FIG. 5B.

In step S408, hole detection unit 342 may detect the hole polygons in the textured polygon mesh. Consistent with the present disclosure, hole polygons correspond to the polygons in the structure polygon mesh constructed in step S402 but lack texture information during the mapping of step S404. For example, hole detection unit 342 may compare the "mesh.ply" file (that contains the structure polygon mesh) with the "output.ply" file (that contains the textured polygon mesh) to locate polygons that miss texture information.

After detecting the hole polygons, in step S410, hole detection unit 342 may identify the hole as the maximum region composed of the connected hole polygons. Various search methods may be implemented by hole detection unit 342 to identify the hole based on the detected hole polygons. In some embodiments, a Breadth-first Search (BFS) algorithm may be implemented. BFS is an algorithm for traversing or searching tree or graph data structures. It starts at the tree root (or some arbitrary node of a graph) and explores all of the neighbor nodes at the present depth prior to moving on to the nodes at the next depth level. For example, hole detection unit 342 may start with one hole polygon, such as polygon 531 in FIG. 5B, and search for hole polygons connected with it. Two hole polygons are "connected" if they share at least one edge or vertex. For example, hole polygon 531 is connected with hole polygon 532, and hole polygon 532 is connected with hole polygon 533. In some embodiments, hole detection unit 342 may grow the hole by continuously adding the connected hole polygons into the hole. For example, hole polygons 531-537 may be included to form hole 501.

In step S412, hole detection unit 342 may further determine an area of the hole. In some embodiments, the area of the hole may be determined by adding up the areas of the individual hole polygons. For example, hole detection unit 342 may compute the areas of hole polygons 531-537 and then sum up the areas to obtain the total area of hole 501.

In step S414, hole detection unit 342 may compare the area of the hole with a predetermined threshold. In some embodiments, the predetermined threshold may be 1 square meter, 2 square meters, 5 square meters, or another proper value. In some embodiments, the predetermined threshold may be set based on the size of the polygons. When the area of the hole is below the predetermined threshold (S414: yes), it suggests that the hole is small enough to be repaired. Accordingly, method 400 proceeds to perform steps S416-S420 for repairing the hole. Otherwise (S414: no), the hole is too large to repair, method 500 will skip steps S416-S420 without attempting to repair the hole.

In step S416, hole filling unit 344 identifies boundary polygons in the textured polygon mesh that are contiguous to the hole. Consistent with the present disclosure, a boundary polygon is considered contiguous to the hole if it shares at least one edge or vertex with a hole polygon in the hole. For example, FIG. 5B shows boundary polygons 511-527 that are contiguous to hole 501.

Figure 6:
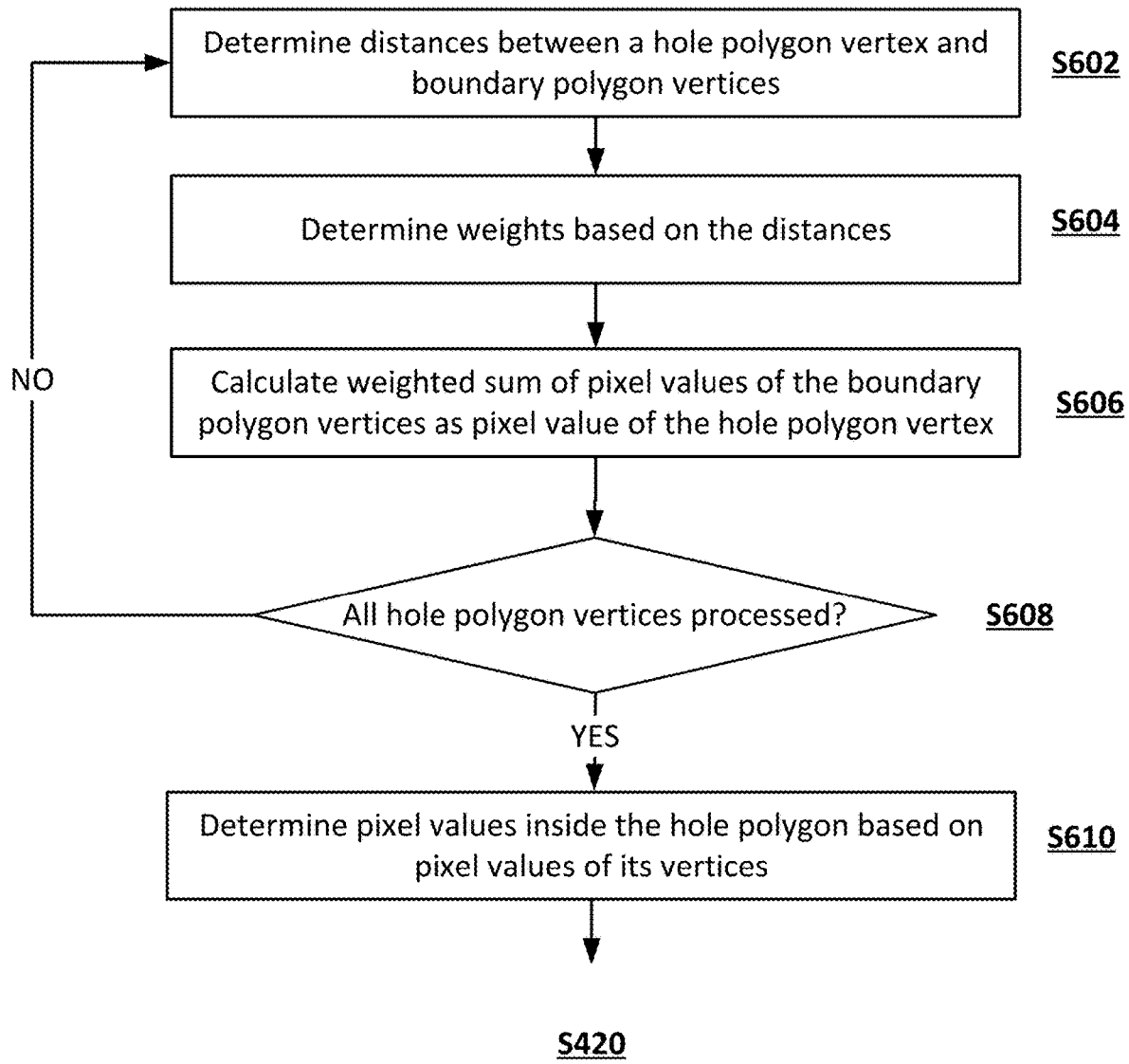
FIG. 6 is a flowchart of an exemplary method for filling a hole in a textured polygon mesh, according to embodiments of the disclosure.

In step S418, hole filling unit 344 determines texture information of the hole polygons based on texture information of the boundary polygons. In some embodiments, the missing texture information in the hole is estimated by extrapolating the known texture information of the boundary polygons. According to embodiments of the disclosure, an exemplary method 600 of FIG. 6 may be implemented by hole filling unit 344 to implement step S418, for filling a hole in a three-dimensional model. Method 600 may include steps S602-S610 as described below. It is to be appreciated that some of the steps may be optional to perform the disclosure provided herein. Further, some of the steps may be performed simultaneously, or in a different order than shown in FIG. 6.

In step S602, hole filling unit 344 may determine distances between a hole polygon vertex and boundary polygon vertices. The distance may be the length of a straight line connecting the hole polygon vertex and a boundary polygon vertex. For example, using hole polygon vertex A in FIG. 5B as an example, it is a shared vertex of four hole polygons 533-536. The distances between vertex A and boundary polygon vertices, such as vertices B-F, are calculated. It is contemplated that more boundary polygon vertices may be included than those illustrated.

In step S604, hole filling unit 344 may determine weights that indicate the influence of the boundary polygon vertices on the hole polygon vertex. In some embodiments, the weights may be determined based on the respective distances. For example, the weights be reversely proportional to the distances and add up to 1. Therefore, the farther a boundary polygon vertex, the less influential its pixel value to the pixel value of the hole polygon vertex. For example, in FIG. 5B, vertices B and F are less influential than vertices C, D, and E, to vertex A.

In step S606, hole filling unit 344 may calculate a weighted sum of the pixel values of the boundary polygon vertices as they are weighted by the weights determined in step S604. The calculated weighted sum may be assigned as the pixel value of the hole polygon vertex.

In step S608, hole filling unit 344 may determine if all hole polygon vertices are considered. If so, method 600 may proceed to step S610. Otherwise, method 600 will return to step S602 to consider the next hole polygon vertex and determine its pixel value using steps S602-S606.

In step S610, hole filling unit 344 determines pixel values inside each hole polygon based on the estimated pixel values of the hole polygon vertices. In some embodiments, fusion methods may be used to fill the pixel values inside the hole polygons. For example, a Gaussian process may be used for the fusion processing. A Gaussian process is a stochastic process, such that every finite collection of those random variables has a multivariate normal distribution, i.e. every finite linear combination of them is normally distributed. The Gaussian process measures the similarity between points to predict the value for an unseen point.

Although method 600, as described, implements a weighted sum approach to estimate the pixel values of the hole polygons, a person of ordinary skill in the art may recognize that other predication methods may be used for the estimation. For example, machine learning methods can be used to intelligently "learn" the missing texture information. In some embodiments, a learning network may be trained using manifold textured polygon meshes to automatically predict missing pixel values for a textured polygon mesh that contains a hole.

After step S610, method 600 concludes and method 400 proceeds to step S420. Referring back to FIG. 4, in step S420, hole filling unit 344 repairs the hole using the estimated texture information (i.e., the pixel values) of the hole polygons. Like in step S404, hole filling unit 344 maps the estimated texture information to the hole polygons of the textured polygon mesh. For example, as shown in FIGS. 5A and 5B, once texture information is added to hole polygons 531-537, hole 501 is filled.

By filling holes in the three-dimensional model using texture information of boundary polygons that are contiguous to the hole polygons, the disclosed systems and methods make the VR tour more closely mimic a real house tour, thus improving user experience.

Although the exemplary three-dimensional model used to describe the disclosed systems and methods is a model for a property, it is contemplated that the disclosed systems and methods may also be applied to construct three-dimensional models of other objects, such as a vehicle, a person, an animal, a road segment, a park, etc. A person of ordinary skill can adapt the disclosed systems and methods without undue experimentation for different three-dimensional models.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for constructing a three-dimensional virtual reality model of a property, comprising:

a storage device configured to store point cloud data and texture information captured of an interior of the property; and at least one processor configured to:
receive a user instruction for touring the property;
construct a structure polygon mesh of the three-dimensional virtual reality model based on the point cloud data, the structure polygon mesh including a first set of polygons;
construct a textured polygon mesh of the three-dimensional virtual reality model by mapping the texture information to the structure polygon mesh, the textured polygon mesh including a second set of polygons;
select a first hole polygon from the first set of polygons that is missing from the second set of polygons;
identify a hole in the textured polygon mesh by searching from the first hole polygon for a plurality of connected hole polygons using a tree structure search;
determine an area of the hole is below a predetermined threshold;
identify boundary polygons in the second set of polygons that are contiguous to the hole;
estimate texture information of the hole polygons based on texture information of the boundary polygons and respective distances between the hole polygons and the boundary polygons;
repair the textured polygon mesh using the estimated texture information of the hole polygons; and
provide a virtual reality tour of the property in the repaired three-dimensional virtual reality model.

2. The system of claim 1, wherein the first set of polygons, the second set of polygons, and the hole polygons are triangles.

3. The system of claim 1, wherein to identify the hole in the textured polygon mesh, the at least one processor is configured to identify a third set of polygons from the first set of polygons that do not have corresponding textured polygons in the second set of polygons.

4. The system of claim 3, the hole polygons in the hole correspond to the third set of polygons.

5. The system of claim 1, wherein to estimate texture information for the hole polygons, the at least one processor is further configured to:
determine pixel values for vertices of each hole polygon; and
determine pixel values inside each hole polygon based on the pixel values of its vertices.

6. The system of claim 5, wherein to determine the pixel value for a vertex of a hole polygon, the at least one processor is further configured to:
determine distances between the vertex and vertices of boundary polygons; and
calculate a weighted sum of pixel values of the vertices of boundary polygons, wherein the pixel values of the boundary vertices are inversely weighted by the distances between the vertex of the hole polygon and vertices of the respective boundary vertices.

7. The system of claim 5, wherein to determine pixel values inside each hole polygon, the at least one processor is further configured to perform data fusion on the pixel values of the vertices of the hole polygon based on a Gaussian process.

8. The system of claim 1, wherein to determine the area of the hole, the at least one processor is further configured to:
determine areas of the hole polygons in the hole; and
determine the area of the hole as a sum of the areas of the hole polygons.

9. The system of claim 1, wherein the structure polygon mesh is constructed from the point cloud data using Poisson surface reconstruction.

10. A computer-implemented method for constructing a three-dimensional virtual reality model of a property, comprising:
receiving a user instruction for touring the property;
constructing, by at least one processor, a structure polygon mesh of the three-dimensional virtual reality model based on point cloud data captured of an interior of the property, the structure polygon mesh including a first set of polygons;
constructing, by the at least one processor, a textured polygon mesh of the three-dimensional virtual reality model by mapping texture information to the structure polygon mesh, the textured polygon mesh including a second set of polygons;
selecting a first hole polygon from the first set of polygons that is missing from the second set of polygons;
identifying, by the at least one processor, a hole in the textured polygon mesh by searching from the first hole polygon for a plurality of connected hole polygons using a tree structure search;
determining, by the at least one processor, an area of the hole is below a predetermined threshold;
identifying, by the at least one processor, boundary polygons in the second set of polygons that are contiguous to the hole;
estimating, by the at least one processor, texture information of the hole polygons based on the texture information of the boundary polygons and respective distances between the hole polygons and the boundary polygons;
repairing, by the at least one processor, the textured polygon mesh using the estimated texture information of the hole polygons; and
providing a virtual reality tour of the property in the repaired three-dimensional virtual reality model.

11. The computer-implemented method of claim 10, wherein the first set of polygons, the second set of polygons, and the hole polygons are triangles.

12. The computer-implemented method of claim 10, wherein identifying the hole in the textured polygon mesh further includes identifying a third set of polygons from the first set of polygons that do not have corresponding textured polygons in the second set of polygons.

13. The computer-implemented method of claim 12, the hole polygons in the hole correspond to the third set of polygons.

14. The computer-implemented method of claim 10, wherein estimating texture information for the hole polygons further include:
determining pixel values for vertices of each hole polygon; and
determining pixel values inside each hole polygon based on the pixel values of its vertices.

15. The computer-implemented method of claim 14, wherein determining the pixel value for a vertex of a hole polygon further includes:
determining distances between the vertex and vertices of boundary polygons; and
calculating a weighted sum of pixel values of the vertices of boundary polygons, wherein the pixel values of the boundary vertices are inversely weighted by the distances between the vertex of the hole polygon and vertices of the respective boundary vertices.

16. The computer-implemented method of claim 14, wherein determining pixel values inside each hole polygon further includes performing data fusion on the pixel values of the vertices of the hole polygon based on a Gaussian process.

17. The computer-implemented method of claim 10, wherein determining the area of the hole further includes:
determining areas of the hole polygons in the hole; and
determine the area of the hole as a sum of the areas of the hole polygons.

18. The computer-implemented method of claim 10, wherein the structure polygon mesh is constructed from the point cloud data using Poisson surface reconstruction.

19. A non-transitory computer-readable medium having stored thereon computer instructions, when executed by at least one processor, perform a method for constructing a three-dimensional virtual reality model of a property, comprising:
receiving a user instruction for touring the property;
constructing a structure polygon mesh of the three-dimensional virtual reality model based on point cloud data captured of an interior of the property, the structure polygon mesh including a first set of polygons;
constructing a textured polygon mesh of the three-dimensional virtual reality model by mapping the texture information to the structure polygon mesh, the textured polygon mesh including a second set of polygons;
selecting a first hole polygon from the first set of polygons that is missing from the second set of polygons;
identifying a hole in the textured polygon mesh by searching from the first hole polygon for a plurality of connected hole polygons using a tree structure search;
determining an area of the hole is below a predetermined threshold;
identifying boundary polygons in the second set of polygons that are contiguous to the hole;
estimating texture information of the hole polygons based on texture information of the boundary polygons and respective distances between the hole polygons and the boundary polygons;
repairing the textured polygon mesh using the estimated texture information of the hole polygons; and
providing a virtual reality tour of the property in the repaired three-dimensional virtual reality model.

20. The non-transitory computer-readable medium of claim 19, wherein estimating texture information of the hole polygons further includes:
determining pixel values for vertices of each hole polygon as a weighted sum of pixel values of the vertices of boundary polygons, wherein the pixel values of the boundary vertices are inversely weighted by distances between the vertices of the hole polygon and vertices of the respective boundary vertices; and
determining pixel values inside each hole polygon based on the pixel values of its vertices based on a Gaussian process.

* * * * *